United States Patent
Coningsby et al.

(10) Patent No.: US 8,141,117 B1
(45) Date of Patent: Mar. 20, 2012

(54) PC MEDIA CENTER AND EXTENSION DEVICE FOR INTERFACING WITH A PERSONAL VIDEO RECORDER THROUGH A HOME NETWORK

(75) Inventors: Donna Jo Coningsby, Kirkland, WA (US); John M. Kellum, Seattle, WA (US); Charles R. Broadus, Bothell, WA (US); Matthew R. Lobeck, Kent, WA (US); Kory D. Christensen, Kaysville, UT (US)

(73) Assignee: ARRIS Group, Inc., Suwanee, GA (US)

( * ) Notice: Subject to any disclaimer, the term of this patent is extended or adjusted under 35 U.S.C. 154(b) by 1307 days.

(21) Appl. No.: 10/261,071

(22) Filed: Sep. 30, 2002

(51) Int. Cl.
*N04N 7/20* (2006.01)

(52) U.S. Cl. ........... 725/55; 725/110; 725/131; 725/151

(58) Field of Classification Search ............... 725/55, 725/151, 131, 110
See application file for complete search history.

(56) References Cited

U.S. PATENT DOCUMENTS

| | | | | |
|---|---|---|---|---|
| 4,977,455 | A | * | 12/1990 | Young ........................ 348/460 |
| 5,138,649 | A | | 8/1992 | Krisbergh et al. |
| 5,353,121 | A | | 10/1994 | Young et al. |
| 5,532,754 | A | * | 7/1996 | Young et al. .................. 725/47 |
| 5,673,401 | A | | 9/1997 | Volk et al. |
| 5,675,390 | A | | 10/1997 | Schindler et al. ............. 348/552 |
| 5,884,039 | A | | 3/1999 | Ludwig et al. |
| 5,886,732 | A | | 3/1999 | Humpleman .................. 348/10 |
| 5,949,328 | A | | 9/1999 | Latty |
| 5,987,256 | A | | 11/1999 | Wu et al. |
| 5,990,927 | A | * | 11/1999 | Hendricks et al. ............ 725/132 |
| 6,005,861 | A | * | 12/1999 | Humpleman .................. 370/352 |
| 6,097,441 | A | | 8/2000 | Allport ........................ 348/552 |
| 6,167,443 | A | | 12/2000 | Decker et al. |
| 6,198,479 | B1 | | 3/2001 | Humpleman et al. ........ 345/329 |
| 6,202,211 | B1 | | 3/2001 | Williams, Jr. |
| 6,289,169 | B1 | | 9/2001 | Okuyama ...................... 386/83 |
| 6,378,000 | B1 | | 4/2002 | Akatsu et al. ................. 709/245 |
| 6,425,129 | B1 | | 7/2002 | Sciammarella et al. |
| 6,481,013 | B1 | | 11/2002 | Dinwiddie et al. ............. 725/80 |
| 6,493,874 | B2 | * | 12/2002 | Humpleman .................. 725/78 |
| 6,510,152 | B1 | | 1/2003 | Gerszberg et al. |
| 6,590,604 | B1 | | 7/2003 | Tucker et al. |

(Continued)

FOREIGN PATENT DOCUMENTS

WO     WO 00/65429     11/2000

OTHER PUBLICATIONS

Office Action mailed Jul. 12, 2007, for U.S. Appl. No. 10/259,200, filed Sep. 27, 2002.

(Continued)

*Primary Examiner* — Joseph P Hirl
*Assistant Examiner* — Jivka Rabovianski
(74) *Attorney, Agent, or Firm* — Troy A. Van Aacken; Robert J. Starr

(57) ABSTRACT

A personal computer media center is connected to a media center extension and a personal video recorder (PVR) through a home network. The personal computer media center instructs the PVR through the home network to record a television broadcast. Subsequently, the personal computer media center instructs the PVR through the home network to output a media signal of the recorded television broadcast to the media center extension, which displays the media signal on a television.

24 Claims, 13 Drawing Sheets

U.S. PATENT DOCUMENTS

| | | | |
|---|---|---|---|
| 6,622,307 B1* | 9/2003 | Ho | 725/120 |
| 6,640,239 B1 | 10/2003 | Gidwani | |
| 6,678,737 B1 | 1/2004 | Bucher | |
| 6,889,385 B1 | 5/2005 | Rakib et al. | |
| 6,909,849 B1 | 6/2005 | Staley | |
| 6,957,396 B2 | 10/2005 | Iwamura | |
| 6,976,228 B2 | 12/2005 | Bernhardson | |
| 7,139,983 B2 | 11/2006 | Kelts | |
| 7,200,857 B1 | 4/2007 | Rodriguez et al. | |
| 2001/0005906 A1* | 6/2001 | Humpleman | 725/82 |
| 2002/0051083 A1 | 5/2002 | Aratani et al. | |
| 2002/0057893 A1 | 5/2002 | Wood et al. | |
| 2002/0059625 A1 | 5/2002 | Kurauchi | |
| 2002/0087968 A1* | 7/2002 | Krishnan et al. | 725/6 |
| 2002/0095615 A1 | 7/2002 | Hastings et al. | |
| 2002/0095689 A1* | 7/2002 | Novak | 725/151 |
| 2002/0104090 A1 | 8/2002 | Stettner | |
| 2002/0174444 A1* | 11/2002 | Gatto et al. | 725/133 |
| 2003/0066082 A1 | 4/2003 | Kliger et al. | |
| 2003/0084452 A1 | 5/2003 | Ryan et al. | |
| 2003/0090524 A1 | 5/2003 | Segerberg et al. | |
| 2003/0093804 A1* | 5/2003 | Chang et al. | 725/95 |
| 2003/0093812 A1* | 5/2003 | Chang et al. | 725/133 |
| 2003/0117440 A1 | 6/2003 | Hellyar et al. | |
| 2003/0126242 A1 | 7/2003 | Chang | |
| 2003/0188320 A1 | 10/2003 | Shing | |
| 2004/0031058 A1* | 2/2004 | Reisman | 725/112 |
| 2004/0049794 A1* | 3/2004 | Shao et al. | 725/89 |
| 2004/0244056 A1 | 12/2004 | Lorenz et al. | |
| 2004/0250273 A1* | 12/2004 | Swix et al. | 725/25 |
| 2004/0261099 A1 | 12/2004 | Durden et al. | |
| 2005/0226324 A1 | 10/2005 | Ouyang et al. | |
| 2005/0251827 A1 | 11/2005 | Ellis et al. | |
| 2006/0053447 A1* | 3/2006 | Krzyzanowski et al. | 725/40 |
| 2006/0174266 A1 | 8/2006 | Gatto et al. | |
| 2007/0288958 A1 | 12/2007 | Knudson et al. | |

OTHER PUBLICATIONS

Office Action mailed Aug. 22, 2007, for U.S. Appl. No. 10/260,700, filed Sep. 30, 2002.

Office Action mailed Aug. 22, 2007, for U.S. Appl. No. 10/260,740, filed Sep. 30, 2002.

Office Action mailed Sep. 10, 2007, for U.S. Appl. No. 10/464,826, filed Jun. 18, 2003.

Office Action mailed Feb. 22, 2008, for U.S. Appl. No. 10/260,738, filed Sep. 30, 2002.

Office Action mailed Feb. 6, 2002, for U.S. Appl. No. 10/464,826, filed Jun. 18, 2003.

Office Action mailed Jan. 30, 2008, for U.S. Appl. No. 10/259,200, filed Sep. 27, 2002.

Office Action mailed May 29, 2008, for U.S. Appl. No. 10/260,740, filed Sep. 30, 2002.

Office Action mailed Jan. 11, 2008, for U.S. Appl. No. 10/260,740, filed Sep. 30, 2002.

Office Action mailed Feb. 22, 2008, for U.S. Appl. No. 10/260,739, filed Sep. 30, 2002.

Notice of Allowance mailed Mar. 5, 2008, for U.S. Appl. No. 10/260,700, filed Sep. 30, 2002.

Office Action mailed Feb. 3, 2009 in U.S. Appl. No. 10/259,200, filed Sep. 27, 2002.

Office Action mailed Aug. 19, 2008 in U.S. Appl. No. 10/259,200, filed Sep. 27, 2002.

Office Action mailed Apr. 27, 2009 in U.S. Appl. No. 10/260,740, filed Sep. 30, 2002.

Office Action mailed Nov. 13, 2008 in U.S. Appl. No. 10/260,740, filed Sep. 30, 2002.

Office Action mailed Mar. 17, 2009 in U.S. Appl. No. 10/260,738, filed Sep. 30, 2002.

Office Action mailed Sep. 11, 2008 in U.S. Appl. No. 10/260,738, filed Sep. 30, 2002.

Office Action mailed Sep. 1, 2009 in U.S. Appl. No. 10/259,200, filed Sep. 27, 2002.

Office Action mailed Sep. 30, 2008 in U.S. Appl. No. 10/260,739, filed Sep. 30, 2002.

Office Action mailed Nov. 23, 2009 in U.S. Appl. No. 10/260,738, filed Sep. 30, 2002.

* cited by examiner

PC MEDIA CENTER AND EXTENSION DEVICE FOR INTERFACING WITH A PERSONAL VIDEO RECORDER THROUGH A HOME NETWORK

BACKGROUND

1. Field of the Invention

The present invention relates generally to home entertainment systems.

More specifically, the present invention relates to a home entertainment system for interfacing with a personal video recorder (PVR) through a home network.

2. Description of Background Art

As interactive television (ITV) becomes more popular, greater demands are being placed on cable and satellite set top boxes (STBs) used in home entertainment systems. Popular STBs, such as the Motorola™ DCT2000™, are not sufficiently powerful to implement many of the most requested ITV features, such as videoconferencing, personal video recording (PVR), video and photo editing, and so forth. These and other features would elevate an STB to the status of a "home media center" that provides access to all forms of media—video, audio, text, etc.—using a television set.

Newer, more advanced STBs are needed to implement home media centers, but subscribers may be unwilling to pay for them. Likewise, many cable and satellite providers are not able to advance the cost of $500 to $1,000 per subscriber for the new STBs.

DETAILED DESCRIPTION

Figure 1:
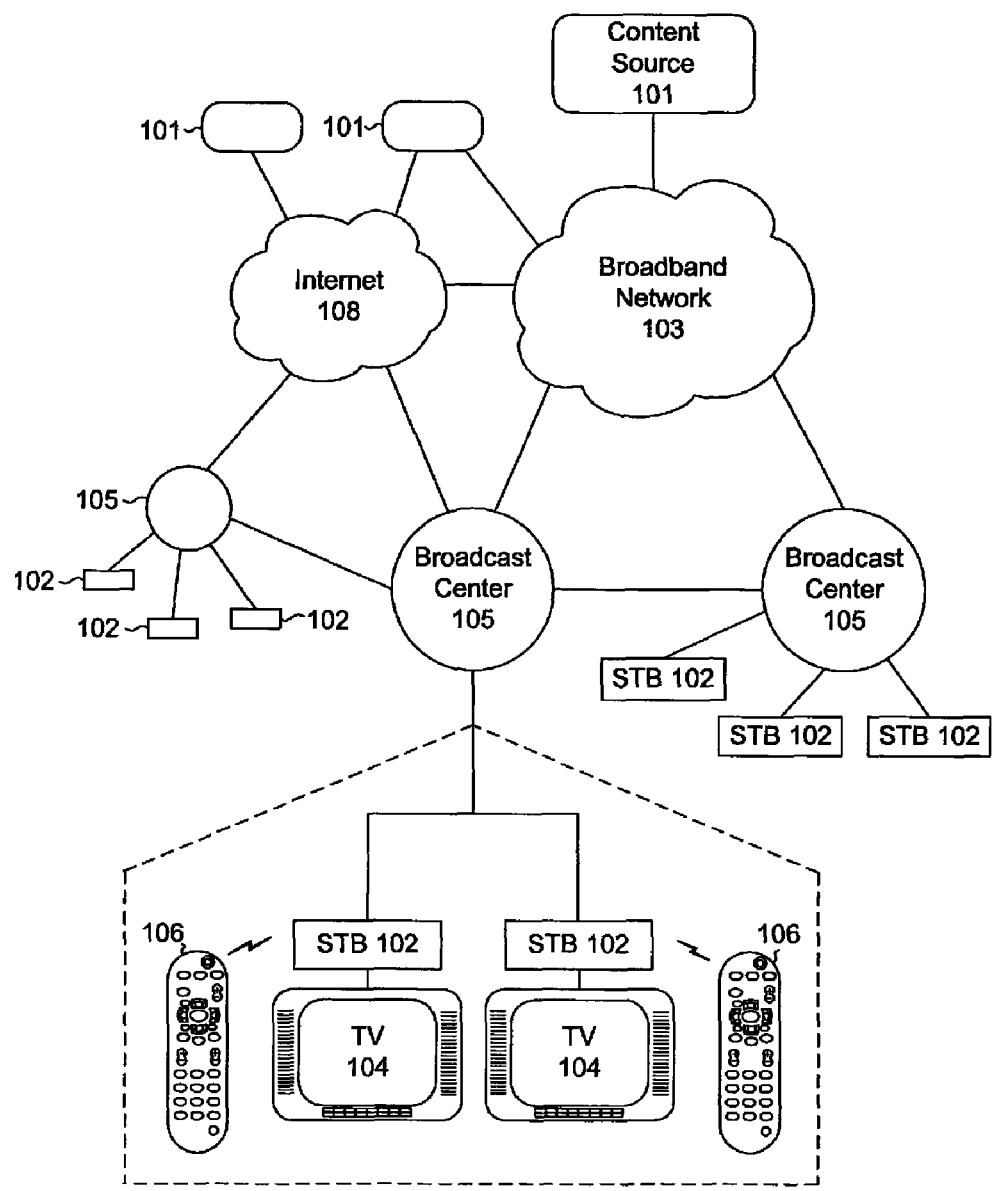
FIG. 1 is a block diagram of a system for distributing media content to subscribers.

Reference is now made to the figures in which like reference numerals refer to like or similar elements. For clarity, the first digit or digits of a reference numeral indicates the figure number in which the corresponding element is introduced.

Throughout the specification, reference to "one embodiment" or "an embodiment" means that a particular described feature, structure, or characteristic is included in at least one embodiment of the present invention. Thus, appearances of the phrases "in one embodiment" or "in an embodiment" in various places throughout this specification are not necessarily all referring to the same embodiment.

As used herein, the term "coupled" refers not only to components that are directly connected, but also to components that are connected via one or more other components. Hence, the term "coupled" may also refer to components that are in communication with one another, although no physical or direct connection may exist.

In the following description, numerous specific details, such as examples of programming, software modules, user selections, network transactions, database queries, database structures, etc., are provided for a thorough understanding of the embodiments of the invention. Those skilled in the art will recognize, however, that the invention can be practiced without one or more of the specific details, or with other methods, components, materials, etc. In other instances, well-known structures, materials, or operations are not shown or not described in detail to avoid obscuring aspects of the invention. Furthermore, the described features, structures, or characteristics may be combined in any suitable manner in one or more embodiments.

As illustrated in FIG. 1, a typical system 100 for distributing media content to subscribers includes one or more content sources 101 linked to plurality of set top boxes (STBs) 102 by a broadband network 103. As used herein, the term "media content" should be broadly construed to include video and/or audio content, pictures, animations, text, software programs, etc. As such, content sources 101 may include television networks, websites, video servers, music servers, software archives, databases, and the like.

An STB 102 receives encoded television signals and data from the content source(s) 101 via the network 103 and displays the same on a television (TV) 104 or similar display device. As its name implies, an STB 102 is typically located in close proximity to the TV 104 (i.e. the STB 102 and the TV 104 are "collocated"). Conventionally, each TV 104 must have its own STB 102 in order to receive and display media content.

The broadband network 103 is typically a cable TV network or a direct broadcast satellite (DBS) network, although other networks are possible. The STBs 102 may be coupled to the network 103 directly or through one or more broadcast centers 105.

Within a cable TV network, a broadcast center 105 is referred to as a "head-end", which is a centrally-located facility within a community in which TV programming is received from a local cable TV satellite downlink or other source and packaged for transmission to subscriber homes. A broadcast center 105 may also be embodied as a satellite broadcast center within a DBS network.

Broadcast centers 105 may be coupled directly to one another or through the broadband network 103. In some cases, broadcast centers 105 may be connected via a separate network, one particular example of which is the Internet 108. Communication over the Internet 108 is accomplished using TCP/IP and other standard protocols.

For each STB 102, a remote control 106 is generally provided for convenient remote operation of the STB 102 and the TV 104. The remote control 106 may use infrared (IR), radio frequency (RF), or other wireless technologies to transmit control signals to the STB 102 and the TV 104.

Figure 2:
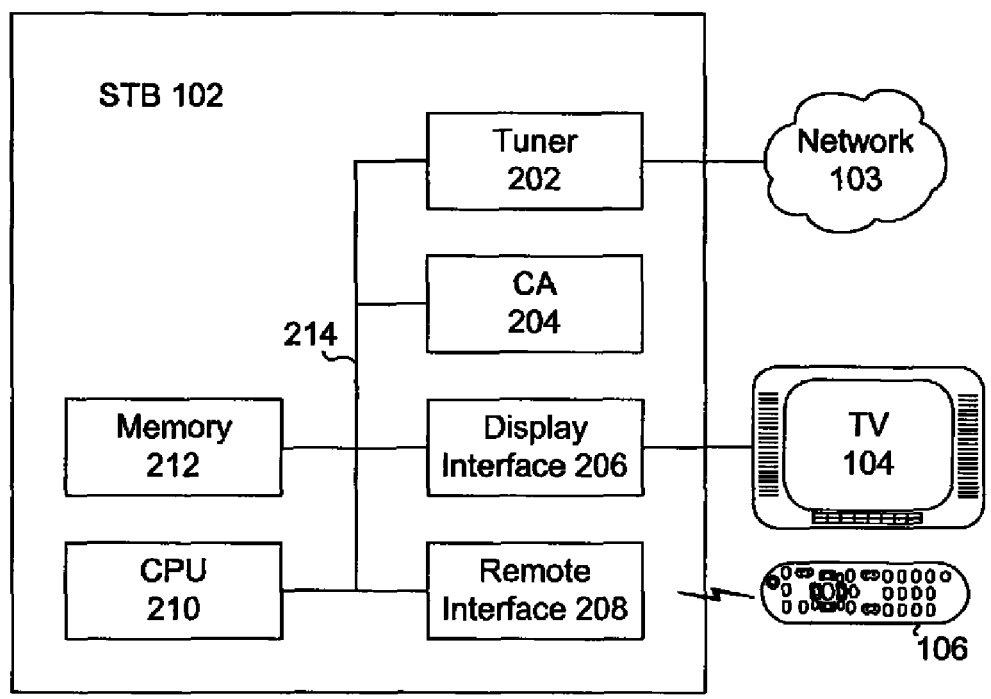
FIG. 2 is a block diagram of a standard set top box (STB)

FIG. 2 is a block diagram of a home entertainment system 200 including a standard STB 102, such as a Motorola™ DCT2000™. As depicted, the STB 102 includes a tuner 202 for selectively receiving media content from the broadband network 103 on different channels or frequencies. Various analog tuners 202 are available, such as the Broadcom™ BCM 3415™.

Increasingly, TV broadcasts are being digitally encoded and multiplexed to maximize bandwidth usage. For instance, "digital" cable utilizes MPEG (Moving Pictures Experts Group) compression to provide subscribers with many more channels than would be possible using analog techniques. Accordingly, a "digital" tuner 202 may include circuitry for selectively demodulating, demultiplexing, and decoding such content.

The STB 102 may also include a conditional access (CA) device 204 for decrypting media content for digital, premium, and pay-per-view (PPV) channels or services (e.g., HBO™, Showtime™, OnDemand™). A CA device 204 makes use of both scrambling and encryption technologies to prevent reception of a signal by unauthorized STBs 102. In one technique, encrypted messages, known as Entitlement Control Message (ECM) and Entitlement Management Message (EMM), are used. CA devices 204 and techniques are known in the art and will not be discussed in greater detail.

The STB 102 further includes a display interface 206 for rendering media content on an attached display device, such as a TV 104. A display interface 206 typically includes a graphical processor, a memory (frame buffer), and various other supporting hardware. A variety of display interfaces 206 are known, such as the ATI™ Xilleon™ 215s or Broadcom™ BCM7061.

The STB 102 also includes a remote interface 208 for receiving and decoding control signals sent by remote control 106. As noted, various wireless techniques may be used, such as infrared (IR), radio frequency (RF), or the like. In one configuration, the remote interface 208 is embodied as an ATMEL™ Mega161™ IR microcontroller.

Typically, the STB 102 includes a memory 212 comprising a combination of one or more standard RAM, ROM, or EEPROM devices. The memory may be used to store user settings, EPG (Electronic Program Guide) data, an operating system (such as Windows CE™ or Linux™), middleware (such as Liberate™), and the like.

The STB 102 also typically includes a CPU 210 for controlling the operation of the STB 102, including the other components thereof, which are coupled to the CPU 210 via a bus 214. The CPU 210 may be embodied as a microprocessor (e.g., Motorola™ 68331), microcontroller, digital signal processor (DSP), or other device known in the art. The CPU 210 performs logical and arithmetic operations based on program code stored within the memory 212.

As previously explained, a growing number of subscribers are demanding advanced ITV features, such as videoconferencing, personal video recording (PVR), video and photo editing, and the like. However, such features require a more advanced STB 302 of the type depicted in the home entertainment system 300 of FIG. 3. One example of an advanced STB 302 is the Motorola™ DCT5200™ set top terminal.

As illustrated, each of the components of the STB 102 are also represented within the advanced STB 302, e.g., the tuner 202, CA device 204, display interface 206, remote interface 208, CPU 210, and memory 212. Typically, however, many of the components of the advanced STB 302 will be faster, have a greater capacity, etc., than those of the STB 102. For instance, the Motorola™ DCT5200™ may have up to 128 MB of RAM, while the DCT2000™ is limited to 7 MB.

The advanced STB 302 also includes a number of components that are not generally found in a standard STB 102. For instance, the advanced STB 302 may include a hard drive 303 for mass storage, as well as a DVD and/or CD player 304 for playing optical media. In addition, the advanced STB 302 may include a modem 305, such as a DOCSIS (Data Over Cable Service Interface Specification) cable modem, for accessing data via the network 103 and/or the Internet 108.

To enable advanced ITV features, the memory 212 of the advanced STB 302 includes a number of software modules. Of course, any of described modules may be implemented using various combinations of software, hardware, and/or firmware.

For instance, the memory 212 may include a personal video recording (PVR) module 306 to facilitate digital recording of media content. The popularity of PVR systems, such as TiVo™ and ReplayTV™, has tremendously increased in recent years. PVR systems provide a wide variety of desirable functions, such as scheduled recording of TV broadcasts for time-shifting purposes, pausing (buffering) of live TV, instant replays, and the like.

The memory 212 may also include an EPG (electronic programming guide) module 308 that provides a subscriber with a view of upcoming television programming. The EPG module 308 may display programming information in various formats, such as a timeline, grid, or the like, allowing a subscriber to easily view upcoming or current programming. In addition, the EPG module 308 may interact with the PVR module 306 to allow a subscriber to select programs for recording directly from an EPG listing. The EPG module 308 obtains programming data through the modem 305 from the Internet 108, a content source 101, servers accessible via the network 103, or via out-of-band signaling from a broadcast center 105.

The memory 212 may further include a web browser 310, such as a version of Microsoft Internet Explorer™, to facilitate access to web content within the Internet 108. Similarly, the memory 212 may include an e-mail client 312, such as Microsoft Outlook™, a chat client 314, such as MSN Messenger™, a videophone client 316, such as Microsoft Netmeeting™, and a media player/editor 318, such as Windows Media Player™ and/or Windows Movie Maker™.

Figure 3:
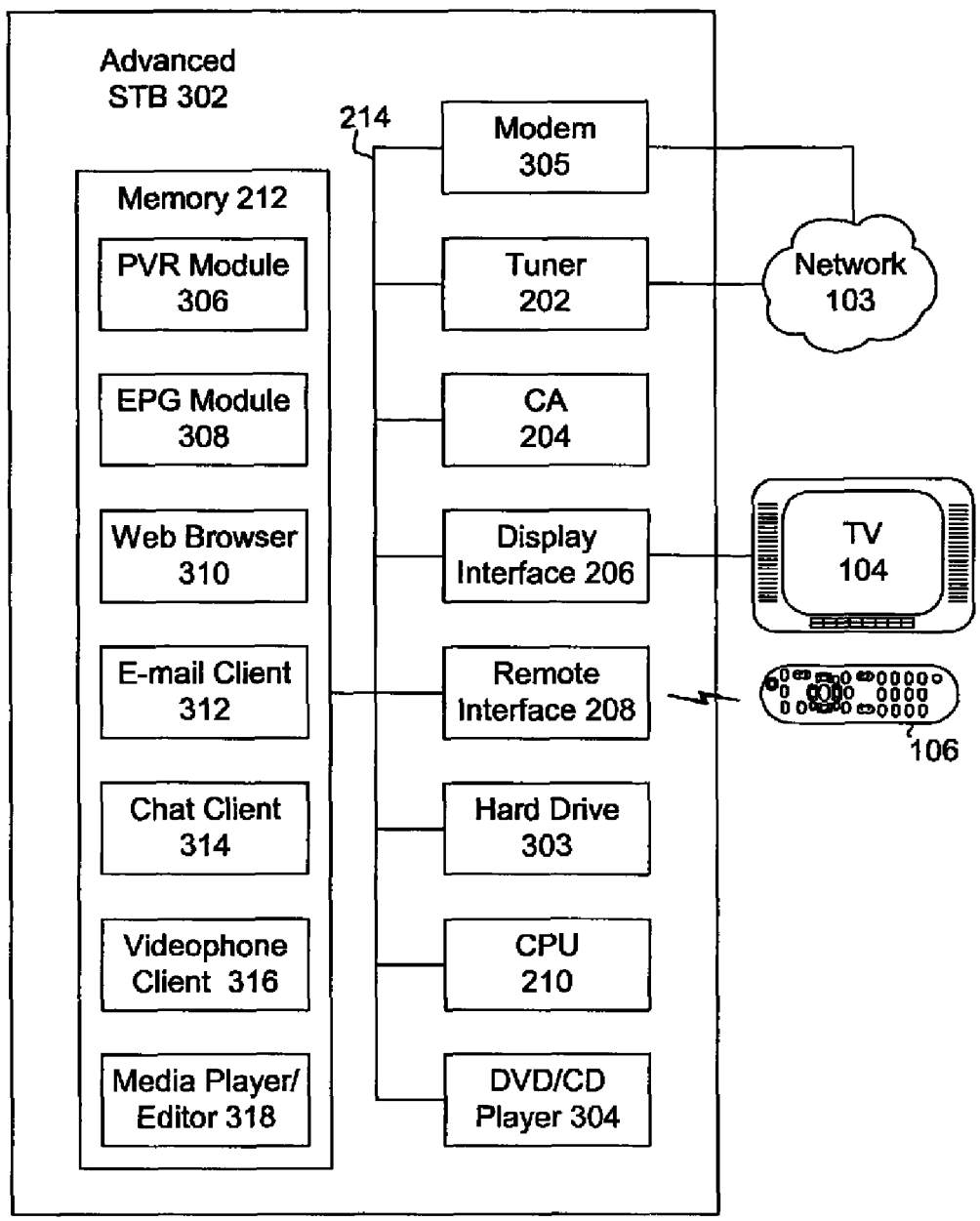
FIG. 3 is a block diagram of an advanced STB.

Unfortunately, advanced STBs 302 of the type depicted in FIG. 3 are relatively expensive. Moreover, a substantial installed base of standard STBs 102 already exists, making it difficult for cable and satellite provider to justify upgrading to the advanced STBs 302 merely to add new ITV features. Nevertheless, demand for the features exists, and a provider that can satisfy the demand at a reasonable cost will have a distinct competitive advantage.

Figure 4:
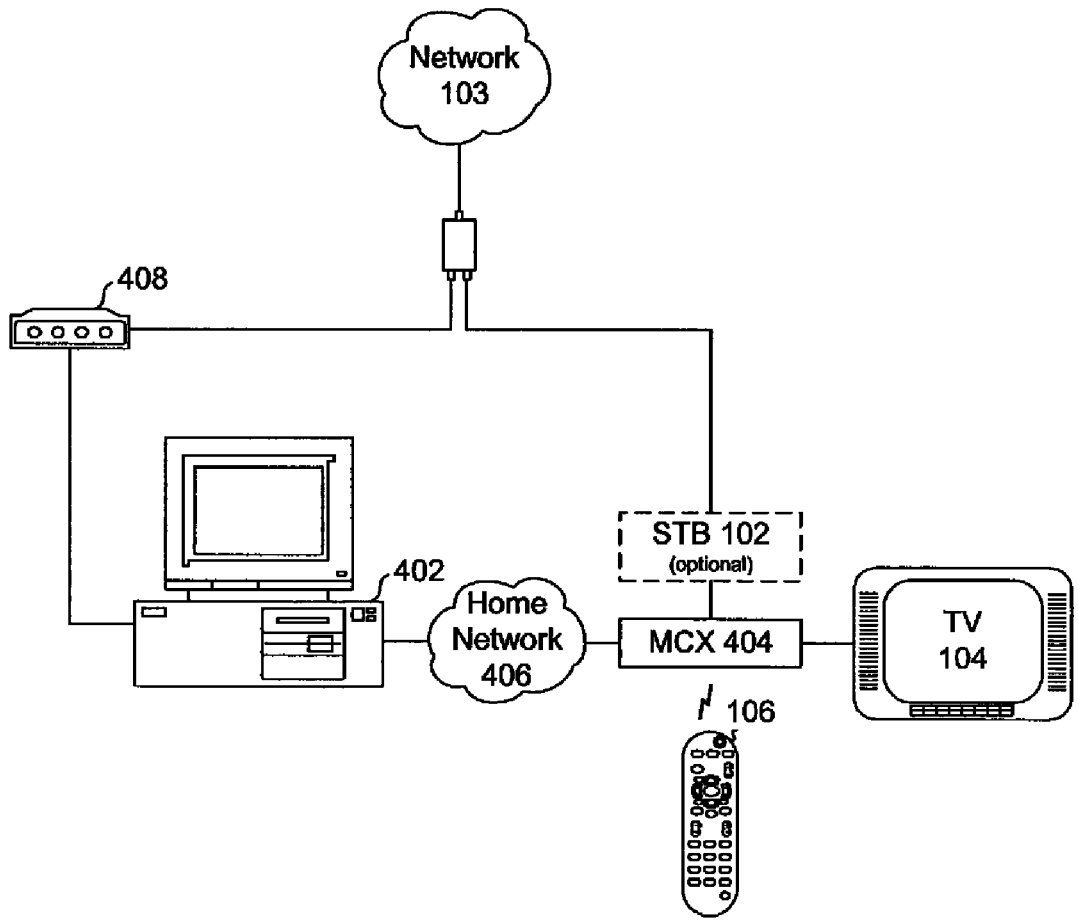
FIG. 4 is a block diagram of home entertainment system including a PC media center (PCMC) and a media center extension (MCX)

FIG. 4 is a block diagram of a home entertainment system 400 according to an embodiment of the invention that satisfies the demand for new ITV features without the cost of purchasing advanced STBs 302. In one configuration, a personal computer (PC) within a subscriber's home is transformed into a PC media center (PCMC) 402. In general, no hardware retrofitting is required. Rather, as explained in greater detail below, software programs are installed on the home PC to provide the media center functions.

In addition, a media center extension (MCX) 404 is provided. As described below, the MCX 404 includes many of the hardware components of an STB 102, but leverages the processing and storage capacity of the PCMC 402 to provide functionality comparable to an advanced STB 302 at a fraction of the cost.

The MCX 404 may be coupled to the PCMC 402 via an existing home network 406. The home network may be embodied as a 10/100 Mbps Ethernet, a 802.11b wireless network, a HomePNA™ network, a HomeCNA™ network, a HomePlug™ network, an IEEE 1394 network, a Bluetooth™ network, or any other suitable wired or wireless network.

As illustrated in FIG. 4, both the PCMC 402 and the MCX 404 may be coupled to the broadband network 103 in order to send and receive media content and other data. In certain configurations, the PCMC 402 may include an internal or external modem 408, such as a Motorola™ DOCSIS cable modem, for interfacing with the broadband network 103.

In various embodiments, the MCX 404 may be optionally coupled to a standard STB 102, such as a Motorola™ DCT2000™. As described in greater detail in connection with FIG. 7, the standard STB 102 may be used for channel tuning and conditional access (CA), which reduces the overall cost of the MCX 404 since hardware support for these features would not then be required within the MCX 404.

The MCX 404 may receive input from a standard IR or RF remote control 106. Likewise, the MCX 404 may produce output for a standard analog or digital TV 104 or similar display device.

A home entertainment system 400 may include any number of MCXs 404. For instance, a plurality of MCXs 404 may be in communication with a PCMC 402 via a hub or wireless LAN (not shown). Each MCX 404 may be coupled to a separate TV 104 and have a separate remote control 106. Accordingly, an entire household may be serviced by a single PCMC 402, which would not be possible conventionally with an advanced STB 302.

Figure 5:
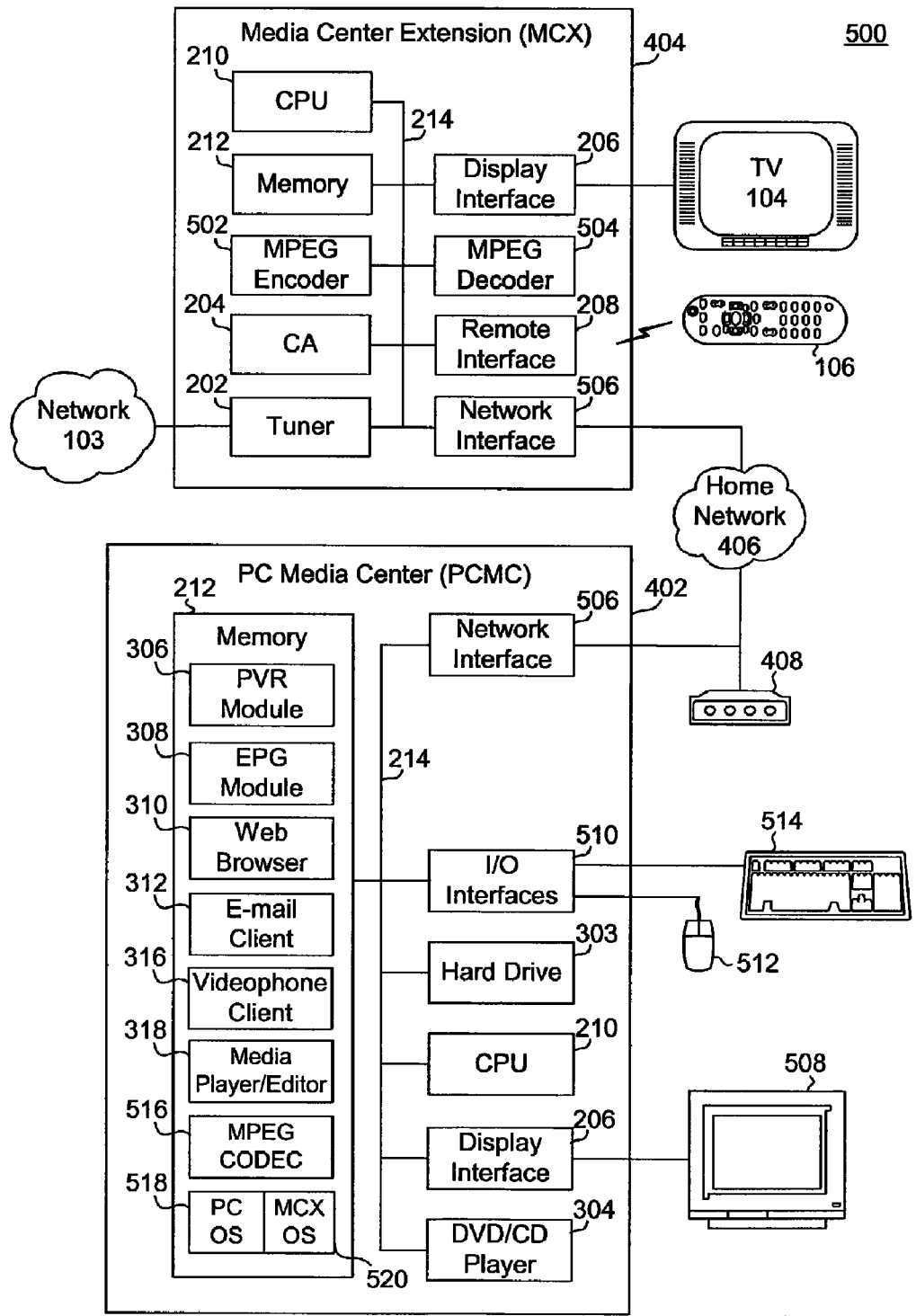
FIG. 5 is a block diagram of a home entertainment system showing details of a PCMC and MCX.

FIG. 5 is a detailed block diagram of a home entertainment system 500 according to an embodiment of the invention. As depicted, the MCX 404 may include components similar to those of a standard STB 102, including a tuner 202, CA device 204, display interface 206, remote interface 208, CPU 210, and memory 212, all of which may be interconnected via a bus 214.

In addition, the MCX 404 may include an MPEG encoder 502, such as an NEC™ μPD61xx encoder, for encoding or transforming audio/video signals received from the network 103 into media streams for transmission to the PCMC 402. The MCX 404 may also include an MPEG decoder 504 for decoding media streams received from the network 103 or the PCMC 402. The MPEG decoder 504 may be embodied as a separate MPEG decoding chip or as part of a display interface 206, such as an ATI™ Xilleon™ 215s or Broadcom™ BCM7061. Of course, the MPEG encoder 502 and the MPEG decoder 504 may be embodied within a single chip or may be implemented using software.

While MPEG is used in a presently preferred embodiment, a variety of other encoding systems may be used within the scope of the invention, such as JPEG, JPEG-LS, H.261, and H.263. Accordingly, the invention should not be construed as being limited to MPEG encoding.

The MCX 404 may additionally include a network interface 506 for communicating with the PCMC 402 over the home network 406. The configuration of the network interface 506 will vary depending on the type of network 406. For instance, the network interface 506 may be embodied as a 10/100 Mbps Ethernet adapter, 802.11b adapter, an IEEE 1394 adapter, or the like.

The PCMC 402 may be implemented using a general purpose personal computer, such as a Dell™ Dimension™ 2200. Accordingly, the PCMC 402 may include various standard components similar to those of an advanced STB 302. For instance, the PCMC 402 may include a display interface 206 for driving a computer monitor 508, a CPU 210, a memory 212, a hard drive 303, a DVD/CD player 304, and so forth.

Furthermore, the PCMC 402 may include a network interface 506 for communicating with the MCX 404 over the home network 406. The network interface 506 may also be coupled to a modem 408 for communicating with the Internet 108 and/or the broadband network 103. Alternatively, the modem 408 may be included within the PCMC 402, itself, as an add-in board.

Additionally, the PCMC 402 may include various I/O interfaces 510 for communicating with various external devices. For instance, the PCMC 402 may include I/O interfaces 510 for receiving input from a mouse 512 and/or keyboard 514. Moreover, the PCMC 402 may include various standard I/O interfaces 510, such as serial ports, parallel ports, USB (universal serial bus) ports, IEEE 1394 (firewire) ports, and the like. All of the components of the PCMC 402 may be interconnected by a bus 214.

The memory 212 of the PCMC 402 may be configured with various software modules similar to those of the advanced STB 302. For instance, the memory 212 of the PCMC 402 may include a PVR module 306, an EPG module 308, a web browser 310, an e-mail client 312, a videophone client 316, and a media player/editor 318.

In addition, the memory 212 of the PCMC 402 may include an MPEG codec 516 (compressor/decompressor), which may be used to decode MPEG streams received from the MCX 404 as well as to encode MPEG streams to be sent to the MCX 404. While the MPEG codec 516 is depicted as a software component, a hardware implementation may be used within the scope of the invention. In such an embodiment, an add-in card, such as the Canopus™ MVR1000™ hardware MPEG-2 encoder, may be provided.

In addition to a PC operating system (OS) 518, such as Windows XP™, the memory 212 of the PCMC 402 may include an OS 520 for the MCX, such as Linux™. In certain configurations, the MCX 404 may boot (i.e., load the OS 520 into memory 212) from a copy stored within the PCMC 402. For instance, the network interface 506 of the MCX 404 may be compatible with the 3Com™ DynamicAccess™ managed PC boot agent or other network boot service. This eliminates the need for the MCX 404 to locally store the MCX OS 520 within a flash memory or hard drive 303.

Figure 6:
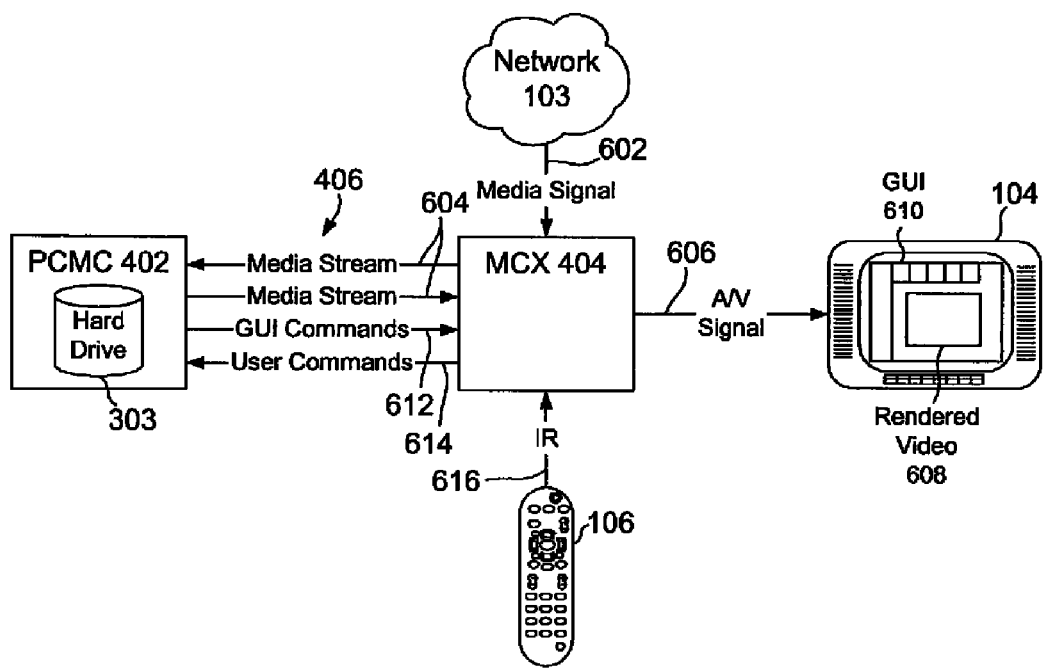
FIG. 6 is a dataflow diagram of the system of FIG. 5.

FIG. 6 depicts the flow of data through the system 500 of FIG. 5. As illustrated, a media signal 602, such as a TV signal, is received by an MCX 404 from the network 103. The media signal 602 may be an analog TV signal, a "digital" cable or satellite TV signal, a Video-on-Demand (VoD) signal, or other transmission.

In one configuration, the MCX 404 encodes the media signal 602 into a media (e.g., MPEG) stream 604 and sends the media stream 604 via the home network 406 to the PCMC 402. Within the PCMC 402, the media stream 604 is recorded or stored in a hard drive 303, memory, or other digital storage device.

Once stored, the media stream 604 may be used or manipulated in a variety of ways. For instance, the media stream 604 may be edited using the media player/editor 318, sent to another subscriber using the videophone client 316 or the e-mail client 312, indexed for subsequent playback by the PVR module 306, etc.

In one configuration, a stored media stream 604 is retrieved from the hard drive 303 and transported via the home network 406 to the MCX 404. The retrieved media stream 604 may be one that was recorded by the PVR module 306, edited by the media player/editor 318, etc. Within the MCX 404, the media stream 604 is decoded by the MPEG decoder 504 and converted by the display interface 206 into an A/V (audio/video) signal 606, which may be displayed as rendered video 608 on the TV 104.

In addition, the PCMC 402 may be responsible for creating and updating a graphical user interface (GUI) 610 on the TV 104. To accomplish this, the PCMC 402 sends GUI commands 612 to the MCX 404, which are used by the display interface 206 to generate the GUI 610. The GUI commands 612 may be embodied, for instance, as low-level VGA (Video Graphics Array) commands which may be directly processed by circuitry within the display interface 206. Alternatively, the GUI commands 612 may be graphical primitives understood by a thin-client module (not shown) within the MCX 404. In still other embodiments, the GUI commands 612 may include higher-level data objects, such as graphics and text. In certain configurations, the GUI commands 612 may be encoded into the media stream 604.

The GUI 610 may provide an interface to various modules within the PCMC 402, such as the PVR module 306, EPG module 308, web browser 310, e-mail client 312, videophone client 316, media player/editor 318, or the like. For instance, the GUI 610 may display a listing of TV programs recorded by the PVR module 306 and allow a subscriber to select one or more of the TV programs for playback, deletion, etc. Likewise, the GUI 610 may display content retrieved by the web browser 310 from the Internet 108.

The PCMC 402 may be further responsible for receiving input from the remote control 106 and relaying certain user commands 614 or requests to the PCMC 402. For instance, the remote control 106 may send an IR command 616 to the MCX 404 in response to the user pressing a button. The IR command 616 is processed by the MCX 404 and, in certain configurations, relayed to the PCMC 402 as a user command 614.

As an example, suppose the TV signal 602 contains a TV program that is scheduled to be recorded by the PVR module 306 of the PCMC 402. The MCX 404 encodes the TV signal 602 into an MPEG stream 604, which is sent to the PCMC 402 where it is stored within the hard drive 303.

Later, a subscriber desires to watch the recorded TV program. The subscriber presses a designated button on the remote control for displaying the GUI 610 on the TV 104. An IR command 616 is sent to the MCX 404, which sends a corresponding user command 614 to the PCMC 402. In turn, the PCMC 402 generates GUI commands 612, which are sent to the MCX 404 and rendered as the GUI 610 on the TV 104.

Navigating the GUI 610 by means of the remote control 106, the subscriber initiates a command to display the recorded TV program. The PCMC retrieves or reads the appropriate MPEG stream 604 from the hard drive 303 and sends the same to the MCX 404 where it is rendered and displayed on the TV 104.

Figure 7:
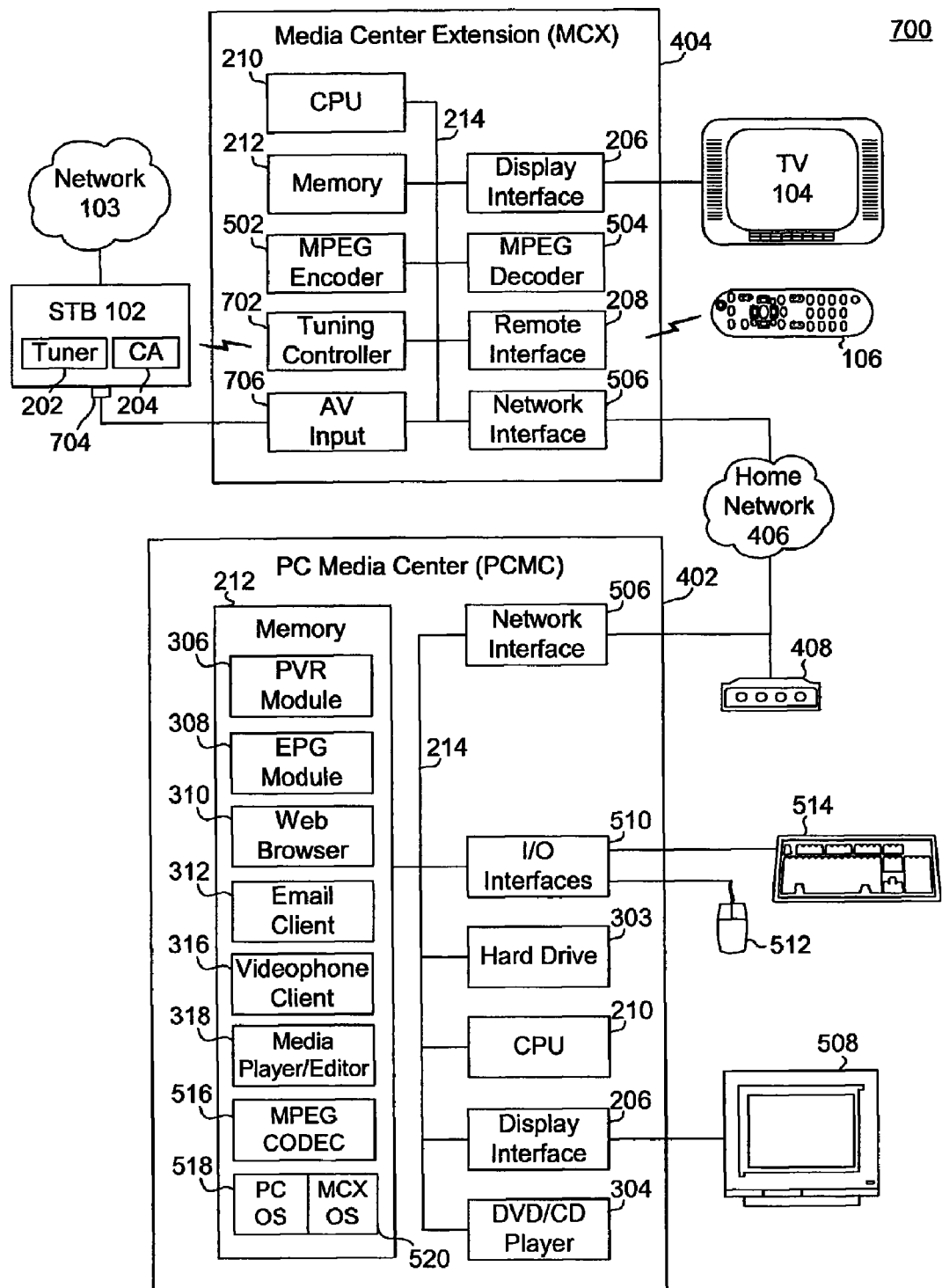
FIG. 7 is a detailed block diagram of an alternative home entertainment system showing details of a PCMC and MCX.

FIG. 7 is a detailed block diagram of a home entertainment system 700 according to an alternative embodiment of the invention. As previously explained, the MCX 404 may be optionally coupled to a standard STB 102, such as a Motorola™ DCT2000™. In such an embodiment, the standard STB 102 is leveraged for its tuner 202 and CA device 204, eliminating the need for such components within the MCX 404. Accordingly, the currently-installed base of standard STBs 102 need not be replaced, and the overall cost of the MCX 404 is thereby reduced.

As depicted, the MCX 404 includes a remote tuning controller 702 for controlling the tuning of the STB 102. In one embodiment, the remote tuning controller 702 simulates a remote control 106 by transmitting appropriate tuning control signals to the STB 102. The remote tuning controller 702 may be embodied, for instance, as an IR emitter (e.g., IR Blaster™), which simulates a remote control 106 by emitting IR commands similar to those of the remote control 106. In alternative embodiments, the remote tuning controller may include a serial cable and suitable driving hardware for transmitting tuning control signals directly to a serial port of the STB 102. The Motorola™ DCT2000™, for example, includes such a serial port for receiving tuning control signals.

Conventionally, an A/V output 704 of the STB 102 is connected to the TV 104. However, in the depicted embodiment, the A/V output 704 of the STB 102 is coupled to an A/V input 706 of the MCX 404. Thus, the MCX 404 receives the same A/V signals that would normally have been received by the TV 104. Various types of A/V connections may be used depending on the capabilities of the STB 102, e.g., composite video, s-video, component video, stereo audio, optical/co-axial digital audio, RF audio/video, etc.

Figure 8:
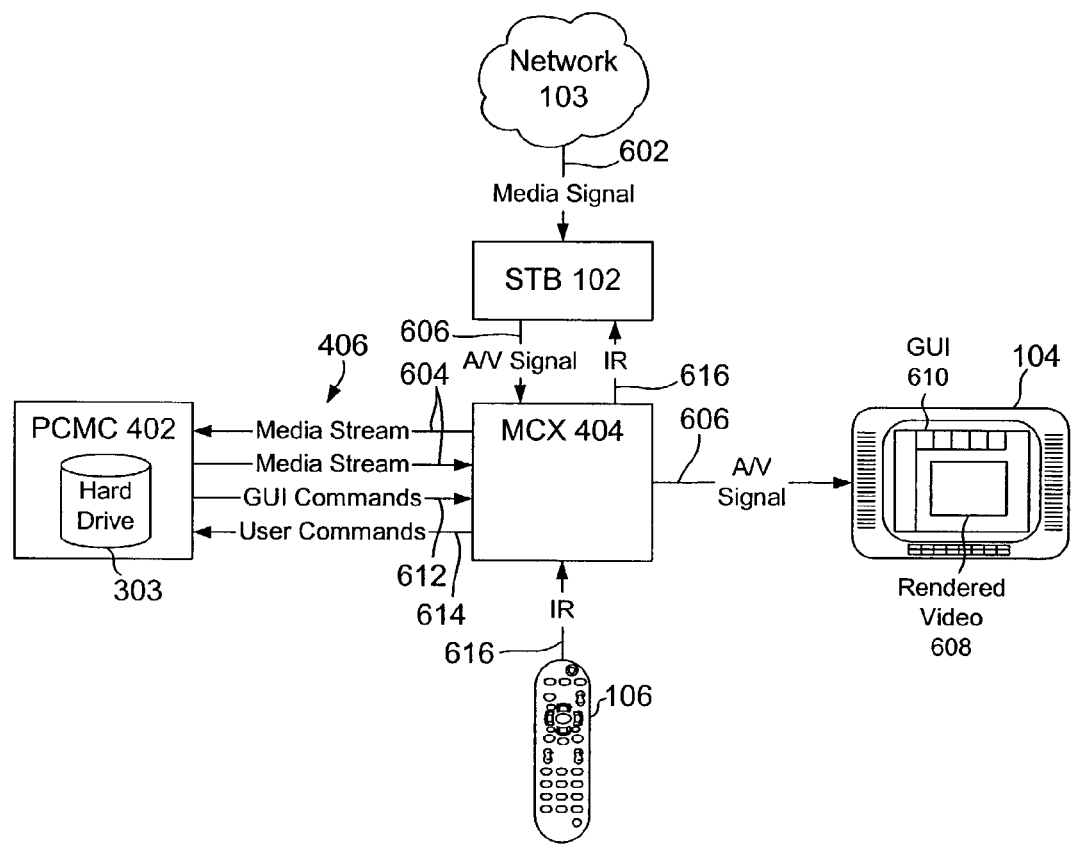
FIG. 8 is a dataflow diagram of the system of FIG. 6.

FIG. 8 depicts the flow of data through the system 700 of FIG. 7. The dataflow of FIG. 8 is similar to that of FIG. 6, except that the TV signal 602 is first received by the STB 102 rather than the MCX 404. The STB 102 generates an A/V signal 606, which is received by the MCX 404. Thereafter, the A/V signal 606 may be encoded, displayed, etc., as described with reference to FIG. 6.

The MCX 404, in turn, controls the tuning of the STB 102 with tuning command signals, e.g. IR commands 616. Thus, the STB 102 becomes an extension of the MCX 404, performing tuning and conditional access functions, while the MCX 404 can be reserved for encoding/decoding tasks and interfacing with the PCMC 402.

Figure 9:
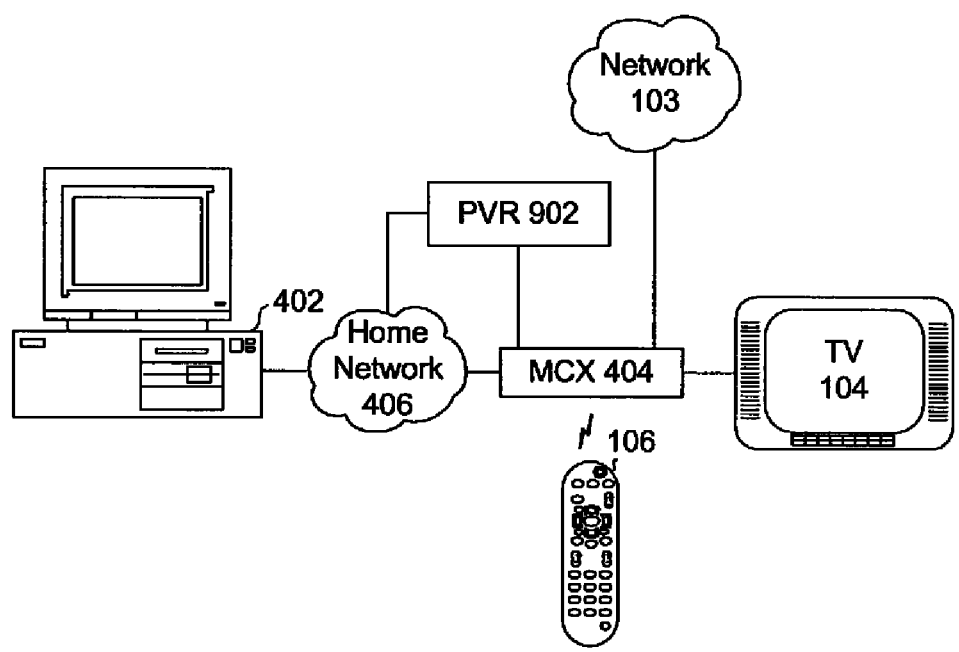
FIG. 9 is a block diagram of a home entertainment system for interfacing with a personal video recorder (PVR) through a home network.

Referring now to FIG. 9, an alternative embodiment is shown of a home entertainment system 900 for interfacing with a personal video recorder (PVR) 902. As noted earlier, the popularity of PVRs 902, such as TiVo™ and ReplayTV™, has tremendously increased in recent years. As such, many households already have PVRs 902. Moreover, some owners have invested in lifetime subscriptions to programming information updates for their PVRs 902 and have a continuing interest in using them, even if the PCMC 402 also provides PVR functionality.

A home entertainment system 900 may advantageously interface with a PVR 902 in one embodiment of the invention. For example, sometimes the PCMC 402 may be unable to fulfill a user request to record a television broadcast. The PCMC 402 may already be recording (or may be scheduled to record) a different program. In such a case, the PCMC 402 may instruct the PVR 902 through the home network 406 to record the broadcast. Later, when a user desires to view the recorded broadcast, the PCMC 402 may instruct the PVR 902 to output the recorded broadcast to an MCX 404 for display on a television 104.

Additionally, the PCMC 402 may utilize the hard disk of the PVR 902 to store media streams and other data, effectively increasing the storage capacity of the system 900. For instance, the PCMC 402 may occasionally exceed the capacity of its own hard drive 303 while recording a broadcast. In such a situation, the PCMC 402 may direct a media stream to be recorded to the PVR 902 for storage. Other data may also be sent to the PVR 902 for storage, such as music files, digital photographs, programs, etc.

Figure 10:
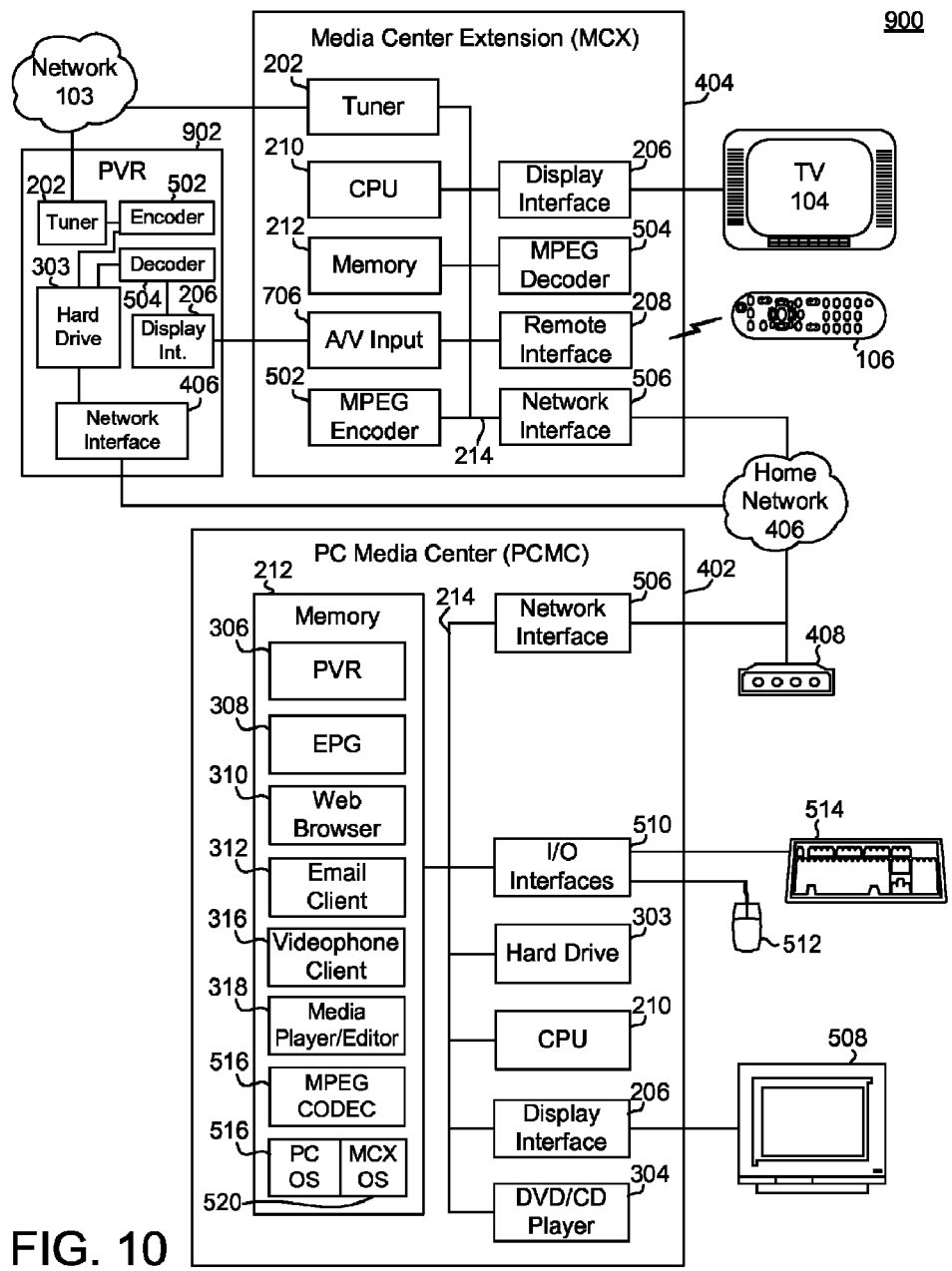
FIG. 10 is a block diagram of the home entertainment system of FIG. 9 showing details of a PCMC, MCX, and PVR.

Referring to FIG. 10, the hardware architecture of the system 900 may be similar to that of the system 500. However, the A/V input 706 of the MCX 404 may be coupled to a display interface 206 of the PVR 902 to receive media signals (e.g., audio/video signals) therefrom. The A/V input 706 of the MCX 404 may be coupled to a display interface 206 of the PVR 902 using standard A/V cabling, e.g., RCA cables or the like.

Typically, a PVR 902 includes a tuner 202 for tuning to a media signal (e.g., television channel) being broadcast through the network 103. An MPEG encoder 502 may encode the media signal into a media stream (e.g., MPEG stream) to be stored within a hard drive 303. An MPEG decoder 504 may decode a stored media stream, which may be sent to the display interface 206 for rendering and display.

In one embodiment, the PVR 902 includes a network interface 506 for communicating with the PCMC 402 through the home network 406. The network interface 506 may be embodied, for instance, as an Ethernet adapter or other interface compatible with the home network 406.

Early models of certain PVR devices, such as TiVo™, did not include a network interface 506 except for a telephone modem used to receive programming updates. However, well known techniques are known for adding a network interface 506 such devices. For instance, TivoNET™ and TurboNET™ upgrade devices allow standard Ethernet adapters or other network interfaces 506 to be installed within a TiVo™. Moreover, recent models of PVRs 902, such as ReplayTV™, are already equipped with network interfaces 506. In general, PVRs 902 include, or may be upgraded with, known software programs to provide access to the file system of the PVR's hard drive 303 through a network 406.

A standard PVR 902 includes a number of additional components, such as a CPU 210, memory 212, etc., that are not specifically illustrated in order to avoid obscuring aspects of the invention. While certain of the components of the PVR 902 have similar reference numerals to components within the PCMC 402 and MCX 404, it should be recognized that the components need not be identical or be provided by the same manufacturer. Moreover, while only a single PVR 902 is depicted, those of skill in the art will recognize that the system 900 may include a plurality of PVRs 902, each of which may communicate with the PCMC 402 through the home network 406, although each PVR 902 is typically connected to a single MCX 404.

Figure 11:
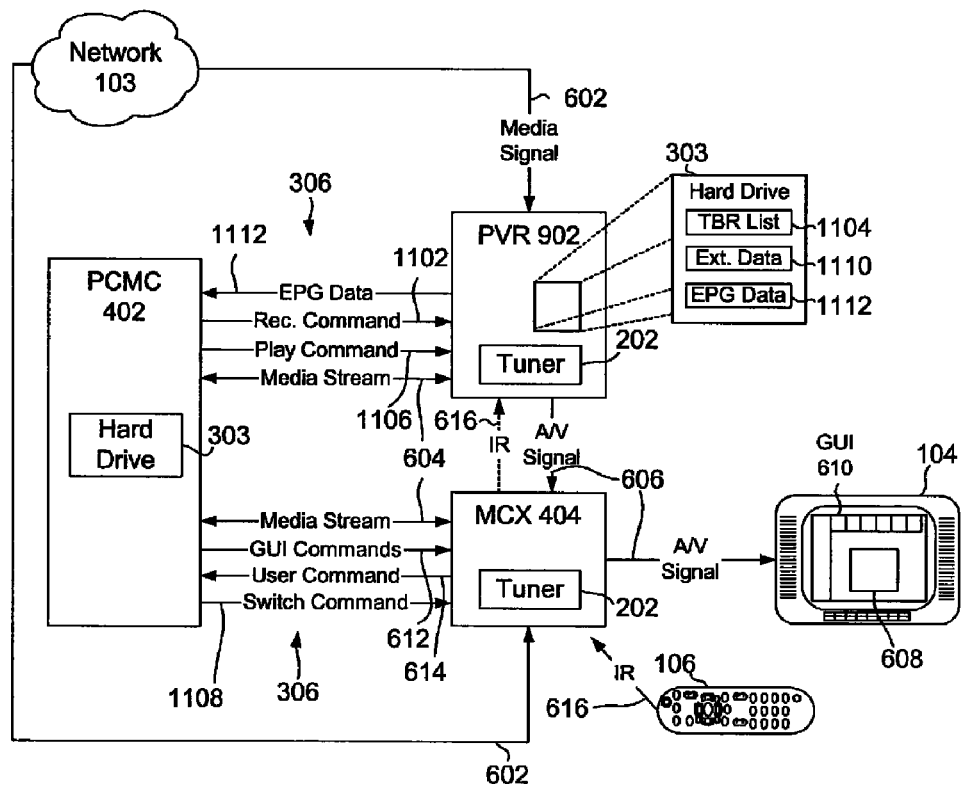
FIG. 11 is a dataflow diagram of the home entertainment system of FIG. 9.

FIG. 11 illustrates a typical flow of data through the system 900. As shown, both the MCX 404 and the PVR 902 receive media signals 602 containing television broadcasts and other information from the network 103.

Suppose that a user requests the PCMC 402 to record a television broadcast and the PCMC 402 is unable to do so. For instance, the broadcast may begin at a time when the tuner 202 of the MCX 404 is being used or is reserved to record a different program. Normally, the PCMC 402 would have to either refuse the request or ask the user whether a conflicting request should be cancelled.

However, in the depicted embodiment, the PCMC 402 may instruct the PVR 902 through the home network 406 to record the broadcast. Since the PVR 902 typically has a separate tuner 202, it is not limited by the fact that the tuner 202 within the MCX 404 is not available.

The PCMC 402 may instruct the PVR 902 to record the broadcast in a number of ways. For instance, a suitable recording command 1102 may be sent to the PVR 902 indicating the broadcast to be recorded by channel, starting time, running time, etc. The format of the recording command 1102 will vary by implementation and will be known by those of skill in the art.

Where the PVR 902 is not configured to receive such commands 1102, the PCMC 402 may access the PVR 902 through the home network 406 to add an indication of the broadcast to a to-be-recorded (TBR) list 1104 within the PVR's hard drive 303. Sometimes, the TBR list 1104 is referred to as a "To-Do" list (in the case of TiVo™), or a recording list. Whatever the list 1104 is called, it is a data structure within the hard drive 303 that indicates the programs to be recorded by the PVR 902. The format of such a data structure is known to those of skill in the art, as are techniques for adding and/or removing indications of broadcasts to be recorded.

In an alternative embodiment, the PCMC 402 may instruct the MCX 404 to transmit an IR command 616 or command sequence that simulates a request to record the broadcast by the PVR's remote control (not shown). Such an IR command 616 may be generated, in one embodiment, by the remote interface 208 of the MCX 404, which may include an IR transceiver. Various devices and techniques are known for simulating a remote control (e.g., IR Blaster™).

Once the PVR 902 has been suitably instructed by the PCMC 402, the PVR 902 will automatically record the broadcast at an appointed time. As previously noted, the recorded broadcast is stored within the hard drive 303 of the PVR 902, typically as an MPEG stream.

Later, a user located by a TV 104 served by an MCX 404 may desire to watch the recorded broadcast. The user activates appropriate buttons on the remote control 106, which results in one or more IR commands 616 being sent to the MCX 404. As illustrated, the MCX 404 may relay corresponding user commands or requests 614 to the PCMC 402.

In one embodiment, the PCMC 402 then instructs the PVR 902 to play back the recorded broadcast. To do so, the PCMC 402 may (1) transmit a suitable playback command 1106 to the PVR 902, (2) store an indication of the recorded broadcast within a "play" list (not shown) or other suitable data structure within the PVR 902, or (3) send a IR command 616 through the MCX 404 to the PVR 902 that simulates a request by the PVR's remote control to play back the broadcast, etc.

During playback, the PVR 902 generates an A/V signal 606 that is received by the MCX 404. The MCX 404 may then send the A/V signal 606 to the TV 104 for display. The MCX 404 may simply relay the A/V signal 606, or the MCX 404 may modify the signal 606 in some way. For instance, the MCX 404 may modify the A/V signal 606 to add a GUI 610 (based on GUI commands 612 received from the PCMC 402).

In one embodiment, the PCMC 402 instructs the MCX 404 using a switch command 1108 to switch between displaying the A/V signal 606 received from the PVR 902 and a signal rendered from a media stream 604 received from the PCMC 402. The switch command 1108 may be sent to the MCX 404, for instance, concurrently with the playback command 1106. Likewise, the switch command 1108 may be sent to the MCX 404 when playback of the recorded broadcast is finished, causing the MCX 404 to resume the display of the signal rendered from the media stream 604.

In certain embodiments, the system 900 may utilize the hard drive 303 of the PVR 902 to store media streams 604 and/or other data. For instance, during recording of a broadcast, the hard drive 303 of the PCMC 402 may exceed its capacity. In one embodiment, a media stream 604 to be recorded may be diverted via the home network 406 to the PVR 902 for storage in an external data area 1110 of the PVR's hard drive 303. The external data area 1110 may be a separate partition, directory, or area that is segregated from partitions, directories, or areas of the hard drive 303 used by the PVR 902. Later, the stored media stream 604 may be retrieved through the home network 406 for use by the PCMC 402. As noted, other data may also be sent to and/or retrieved from the PVR 902, such as music files (e.g., MP3s), digital photographs, programs, etc.

In one configuration, the hard drive 303 of the PVR 902 stores Electronic Program Guide (EPG) data 1112 relating to television and other programming available through the network 103. The EPG data 1112 is typically used by the PVR 902 to generate an interactive EPG for display on the TV 104. An interactive EPG is a listing of current or upcoming TV programming, usually in a grid format, with rows and columns corresponding to either time segments or TV channels. Various embodiments of an EPG are disclosed in U.S. Pat. No. 5,479,266 to Young et al.

The EPG data 1112 is stored in various formats depending on the PVR 902. For instance, the EPG data 1112 may be stored in one or more database tables or in a list. The PVR 902 typically obtains the EPG data 1112 using the network interface 506 (via the network 103) or using a telephone modem. Owners of the PVR 902 often pay a monthly or lifetime fee for obtaining updated EPG data 1112.

In one embodiment, the PCMC 402 retrieves the EPG data 1112 from the PVR 902 through the home network 406. The data 1112 is then used by the EPG module 308 of the PCMC 402 to render an EPG within the GUI 610 being displayed on the TV 104.

Since the PVR 902 already has the EPG data 1112, the PCMC 402 need not acquire duplicate data 1112 from an alternative source, reducing the cost to the subscriber. Also, by retrieving the EPG data 1112, the PCMC 402 may generate a single, consistent GUI 610, obviating the need for a user to directly interact with the PVR 902.

Figure 12:
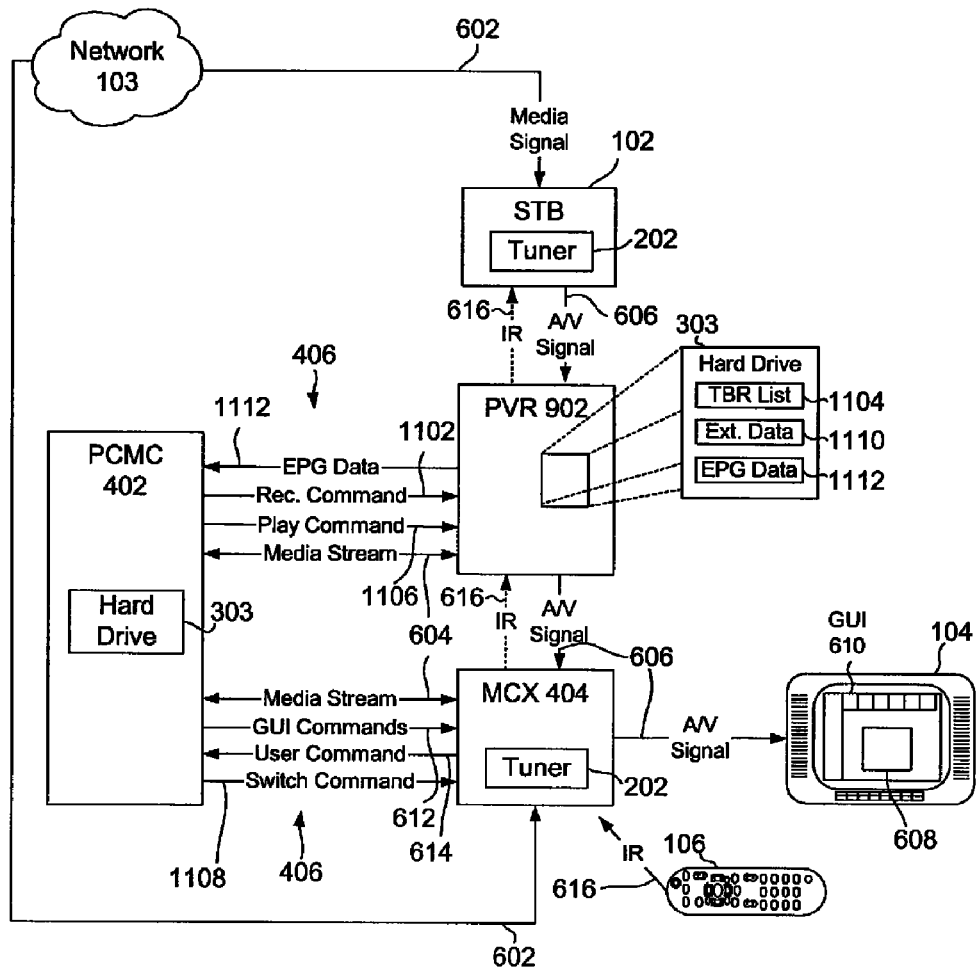
FIG. 12 is an alternative dataflow diagram of the home entertainment system of FIG. 9.

As illustrated in FIG. 12, a PVR 902 may use a standard STB 102, in one embodiment, to tune to certain media signals 602, such as "digital" cable broadcasts. For example, the PVR 902 may not include a tuner 202 or may only include an analog tuner 202. To receive digital broadcasts, the PVR 902 needs a "digital" STB 102, such as a Motorola™ DCT2000™, with a digital tuner 202. Such STBs 102 are common and relatively inexpensive compared to the advanced STB 302 of FIG. 3.

Typically, the PVR 902 controls the STB 102 via IR commands 616 using, for example, an IR Blaster™ or other suitable device. For example, the PVR 902 may send IR commands 616 that instruct the tuner 202 within the STB 102 to tune to a particular digital media signal 602 (e.g., multiplexed MPEG broadcast). The STB 102 then directs an A/V signal 606 of the broadcast to the PVR 902. In other respects, data flows through the system 900 essentially as described in connection with FIG. 11.

Figure 13:
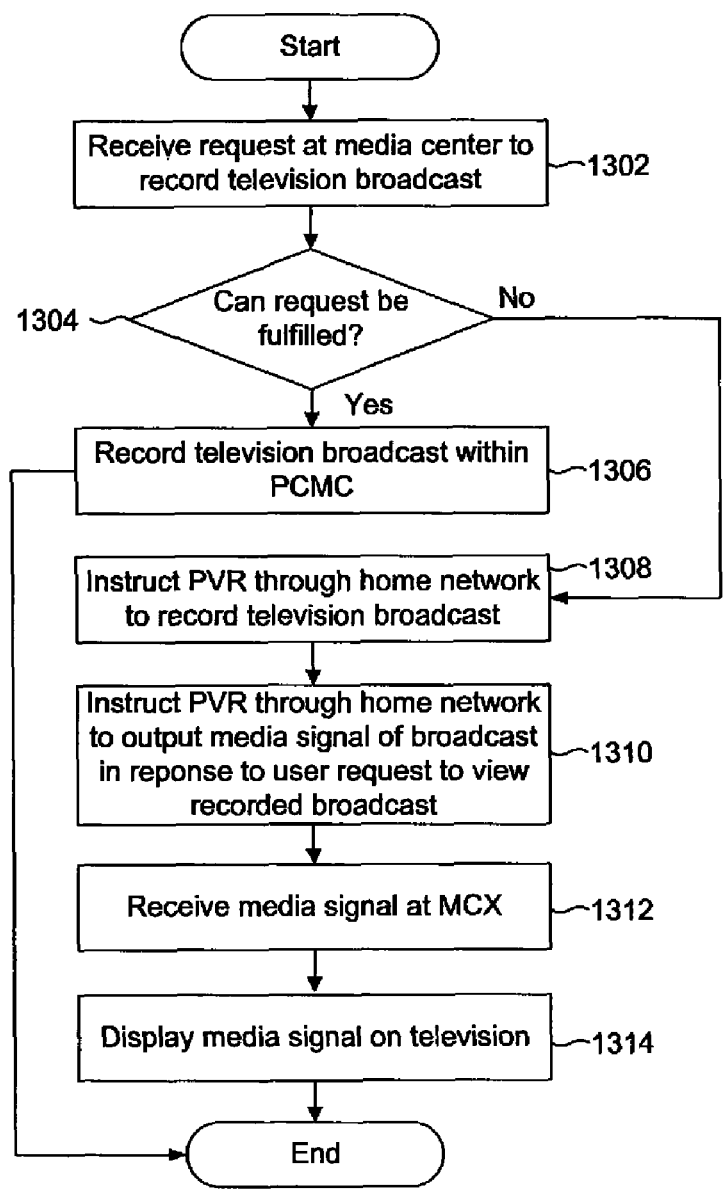
FIG. 13 is a flowchart of a method for utilizing a PVR within a home entertainment system including a PCMC and at least one MCX.

FIG. 13 is a flowchart of a method 1300 for utilizing a PVR 902 in a home entertainment system 900 including a PCMC 402 and at least one MCX 404. A user request is received 1302 at a PCMC 402 to record a television broadcast. A determination 1304 is then made whether the PCMC 402 can fulfill the request, e.g., a tuner 202 is available and not reserved or in use. If so, the PCMC 402 records 1306 the television broadcast using the PVR module 306 and the PCMC's hard drive 303.

If, however, a tuner 202 is not available or the PCMC 402 is otherwise unable to fulfill the request, the PCMC 402 instructs 1308 the PVR 902 through the home network 406 to record the television broadcast. Later, after a user request is received to view the recorded broadcast, the PCMC 402 instructs 1310 the PVR 902 through the home network 406 to output a media signal containing the recorded broadcast. An MCX 404 receives the media signal output by the PVR 902 and displays the media signal on a TV 104.

In view of the foregoing, the present invention offers a number of advantages not found in conventional approaches. Advanced ITV features, such as personal video recording, e-mail, instant messaging, web browsing, and the like, may be provided to multiple TVs 104 throughout the home. Unlike conventional systems, however, expensive STBs 102 are not required at every TV location. Instead, relatively inexpensive MCXs 404 may utilize the processing capabilities of a centralized home PCMC 402 to provide the ITV features to additional TVs 104 at a substantially lower incremental cost.

Additionally, a PCMC 402 may utilize a PVR 902 to record a television broadcast when the PCMC 402 is unable to do so. Furthermore, a PCMC 402 may access the hard drive of the PVR 902 to expand the overall storage capacity of the PCMC 402.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. An entertainment system comprising:
    a personal computer media center including a storage device for storing media signals and a first network interface to a home network, the first network interface for sending and receiving media signals to and from an extension device;
    a set top box comprising a tuner for tuning to a media signal and a conditional access feature for decrypting the media signal, wherein the set top box lacks a set top box network interface to the home network; and
    an extension device coupled to the set top box and in communication with the personal computer media center via the home network, wherein the extension device lacks a tuner and lacks a conditional access feature, and wherein the extension device and the set top box are separate devices, the extension device including:
        an input coupled to the set top box to receive a media signal directly from the set top box, wherein the input is configured to receive a media signal from only the set top box, the media signal being tuned to by the tuner and decoded by the conditional access feature of the set top box;
        an encoder coupled to the input to encode the media signal received from the set top box into a media stream;
        a second network interface to connect the extension device to the media center through the home network to allow the media stream to be sent to the media center and stored on the storage device; and
        a display interface to display the media signal on a television;
    wherein command data, audio streams, and video streams are carried between the personal computer media center and the extension device over the first network interface, through the home network, and through the second network interface; and
    wherein the home network supports contemporaneous connection to at least the personal computer media center, the extension device, and an additional device.

2. The system of claim 1, wherein the first network interface is to instruct a PVR to record a television broadcast in response to the personal computer media center being unable to fulfill a user request to record the television broadcast.

3. The system of claim 1, wherein the first network interface is to instruct a PVR to output a media signal in response to a user request to view a recorded television broadcast.

4. The system of claim 3, wherein the PVR comprises program guide data, and wherein the first network interface is to retrieve the program guide data from the PVR through the home network.

5. The system of claim 4, wherein the personal computer media center uses the retrieved program guide data to generate graphical commands to be sent to the extension device through the home network, and wherein the extension device is to use the graphical commands to generate an electronic program guide (EPG) on the television.

6. The system of claim 3, wherein the PVR comprises a storage device, and wherein the first network interface is to send data to the PVR through the home network for storage within the storage device.

7. The system of claim 6, wherein the first network interface is to retrieve the data stored within the storage device through the home network.

8. The system of claim 3, wherein the first network interface is to instruct the PVR to record a television broadcast by sending a recording command through the home network.

9. The system of claim 3, wherein the first network interface is to instruct the PVR to record a television broadcast by sending an indication of the television broadcast through the home network to a to-be-recorded list within the PVR.

10. The system of claim 3, wherein the first network interface is to instruct the PVR to record a television broadcast by instructing the extension device to simulate a command from a remote control.

11. The system of claim 3, wherein the first network interface is to instruct the PVR to output a media signal of a television broadcast by sending a playback command through the home network.

12. The system of claim 3, wherein the first network interface is to instruct the PVR to output a media signal of a television broadcast by sending an indication of the television broadcast through the home network to a play list within the PVR.

13. The system of claim 3, wherein the first network interface is to instruct the PVR to output a media signal of a television broadcast by instructing the extension device to simulate a command from a remote control.

14. The system of claim 1, wherein the extension device further comprises:
an input interface to receive a user request.

15. The system of claim 1, wherein the extension device further comprises:
an encoder to encode the media signal into a media stream, wherein the second network interface is configured to send the media stream to the personal computer media center through the home network.

16. The system of claim 15, wherein the personal computer media center is to retrieve the media stream from the storage device and send the media stream through the home network to the extension device, the extension device further comprising:
a decoder to decode the media stream back into a media signal, wherein the display interface is to display the media signal on the television.

17. The system of claim 1, wherein the personal computer media center is to generate graphical commands usable by the extension device to render a user interface on the television, and wherein the first network interface is to send the graphical commands to the extension device through the home network.

18. The system of claim 1, wherein the additional device is a cable modem.

19. An entertainment system comprising:
a set top box comprising a tuner for tuning to a media signal and a conditional access feature for decrypting the media signal, wherein the set top box lacks a set top box network interface to a home network;
an extension device including:
an input to receive a first media signal directly from the set top box, the first media signal being tuned to by the tuner and decoded by the conditional access feature, wherein the input is configured to receive a media signal from only the set top box, and wherein the extension device and the set top box are separate devices;
an encoder to encode the first media signal into a media stream; and
a first network interface to the home network, the first network interface to send the media stream through the home network to a personal computer media center;
wherein the extension device lacks a tuner and lacks a conditional access feature; and
a personal computer media center including:
a second network interface to the home network, the second network interface to receive the media stream from the extension device; and
a storage device to store the media stream;
wherein command data, audio streams, and video streams are carried between the personal computer media center and the extension device over the first network interface, through the home network, and through the second network interface; and
wherein the home network supports contemporaneous connection to at least the personal computer media center, the extension device, and an additional device.

20. The system of claim 19, wherein the additional device is a cable modem.

21. A non-transitory computer-readable medium including computer program instructions that cause a computer to implement a method within an entertainment system comprising a personal computer media center connected to an extension device, the extension device lacking a tuner and lacking a conditional access feature, and a personal video recorder (PVR) through a home network, the home network having a first interface to the personal computer media center and a second interface to the PVR, the method comprising:
instructing the PVR through the home network to record a television broadcast;
instructing the PVR through the home network to output a media signal of the recorded television broadcast;
receiving the media signal at an extension device;
displaying the media signal on a television;
receiving a second media signal of a second television broadcast at an input of the extension device directly from a set top box coupled with the extension device, wherein the set top box lacks an interface to the home network, the second media signal having been tuned to by a tuner in the set top box and decrypted by a conditional access feature in the set top box, wherein the input is configured to receive a media signal from only the set top box, and wherein the extension device and the set top box are separate devices;
encoding the second media signal of the second television broadcast into a media stream;
sending the media stream to the personal computer media center through the home network; and
storing the media stream on a storage device at the media center;

wherein command data, audio streams, and video streams are carried between the personal computer media center and the PVR over the first network interface, through the home network, and through the second network interface; and wherein the home network supports contemporaneous connection to at least the personal computer media center, the PVR, and an additional device.

22. The non-transitory computer readable medium of claim 21, wherein the additional device is a cable modem.

23. A method in an entertainment system comprising a personal computer media center, the personal computer media center including a storage device for storing media signals and a first network interface for sending and receiving media signals via a home network to and from a second network interface of an extension device, the method comprising:

within a set top box comprising a tuner and a conditional access feature but lacking a set top box network interface to the home network:
  tuning to the media signal using the tuner; and
  decrypting the media signal using the conditional access feature; and within the extension device for the personal computer media center, the extension device lacking a tuner and a conditional access feature:
  receiving the media signal at an input directly from the set top box, wherein the input is configured to receive a media signal from only the set top box, wherein the extension device and the set top box are separate devices;
  digitally encoding the media signal;
  sending the digitally encoded media signal to the network interface of the personal computer media center via the home network; and within the personal computer media center:
  storing the digitally encoded media signal within the storage device;

wherein command data, audio streams, and video streams are carried between the personal computer media center and the extension device over the first network interface, through the home network, and through the second network interface; and wherein the home network supports contemporaneous connection to at least the personal computer media center, the extension device, and an additional device.

24. The method of claim 23, wherein the additional device is a cable modem.

* * * * *